(12) United States Patent
Touma et al.

(10) Patent No.: US 7,095,433 B1
(45) Date of Patent: Aug. 22, 2006

(54) OPTICAL PRINTER AND DRIVING METHOD THEREFOR

(75) Inventors: Takashi Touma, Saitama (JP); Keiji Tsubota, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 1005 days.

(21) Appl. No.: 09/715,164

(22) Filed: Nov. 20, 2000

(30) Foreign Application Priority Data

Nov. 18, 1999 (JP) .................................. 11-327881

(51) Int. Cl.
*H04N 5/225* (2006.01)
(52) U.S. Cl. ............................... 348/207.2; 348/207.99
(58) Field of Classification Search ............ 348/207.2, 348/207.99; 396/30, 429; 358/475, 906, 358/909.1, 302; 355/18; 347/232, 264, 347/236, 248
See application file for complete search history.

(56) References Cited

U.S. PATENT DOCUMENTS

| | | | | |
|---|---|---|---|---|
| 4,525,729 A | * | 6/1985 | Agulnek et al. ............ 347/237 |
| 4,937,676 A | * | 6/1990 | Finelli et al. ............... 348/375 |
| 5,105,281 A | * | 4/1992 | Kusaka ....................... 358/302 |
| 5,128,773 A | * | 7/1992 | Sato ............................ 386/42 |
| 5,258,856 A | * | 11/1993 | Shinada ...................... 358/474 |
| 5,300,960 A | * | 4/1994 | Pham et al. ................ 347/130 |
| 5,345,315 A | * | 9/1994 | Shalit ......................... 358/406 |
| 5,847,836 A | * | 12/1998 | Suzuki ....................... 358/296 |
| 5,859,658 A | * | 1/1999 | Hammond .................. 347/238 |
| 5,909,248 A | * | 6/1999 | Stephenson ................. 348/373 |
| 5,923,355 A | * | 7/1999 | Fujita et al. ................ 347/131 |
| 5,946,031 A | * | 8/1999 | Douglas ................. 348/207.99 |
| 6,130,700 A | * | 10/2000 | Murayama et al. ......... 347/240 |
| 6,262,757 B1 | * | 7/2001 | Masubuchi et al. ......... 347/225 |
| 6,373,514 B1 | * | 4/2002 | Nakatani ..................... 347/240 |

FOREIGN PATENT DOCUMENTS

EP 1026543 A1 * 8/2000

OTHER PUBLICATIONS

Abstract WO 99/21055, Apr. 29, 1999.

* cited by examiner

*Primary Examiner*—Aung Moe
(74) *Attorney, Agent, or Firm*—Sughrue Mion, PLLC (57) ABSTRACT

There is disclosed an optical printer for printing a grayscale image on a self-developing type photo film unit based on image data. A printing head of the optical printer is provided with a plurality of light emitting elements arranged in a line along a main scan direction whose lighting time lengths are controlled for each pixel in accordance with a tonal level of that pixel. The printing head is shifted relative to the photo film unit in a sub scan direction perpendicular to the main scan direction, to print the image line by line. During each printing cycle of one line, drive voltage applied to the respective light emitting elements are raised with time from an initial value according a predetermined characteristic curve, to increase luminance of the respective light emitting elements as the lighting time for each pixel elapses.

15 Claims, 11 Drawing Sheets

OPTICAL PRINTER AND DRIVING METHOD THEREFOR

BACKGROUND OF THE INVENTION

1. Field of the Invention

The present invention relates to an optical printer whose printing head is provided with an array of light emitting elements each recording one pixel at a time on a photosensitive recording medium, wherein a grayscale image is reproduced by controlling the light emitting elements each individually. The present invention relates also to a method for driving the optical printer.

2. Background Arts

Many kinds of optical printers that are driven based on electronic image data to print an image on a sheet of self-developing type photo film, so-called an instant film unit have been known in the art. Also electronic still cameras integrated with such an optical printer have been on the market. An exemplary of optical printer is provided with a printing head that has an array of light emitting elements arranged along a main scan direction, and a color filter for obtaining red, green and blue light beams from white light beams projected by the light emitting elements. The optical printer selectively drives the light emitting elements to project color light beams toward the instant film sheet while moving in a sub scan direction perpendicular to the main scan direction, whereby an image is recorded line after line on the instant film unit. The optical printer also controls exposure amounts by changing lighting times of the individual light emitting elements, i.e. exposure times for each pixel, to reproduce gradations. In practice, a unit exposure time is predetermined, and each light emitting element is driven for a multiple of the unit exposure time by being applied with a different number of drive pulses having a constant width.

Figure 10:
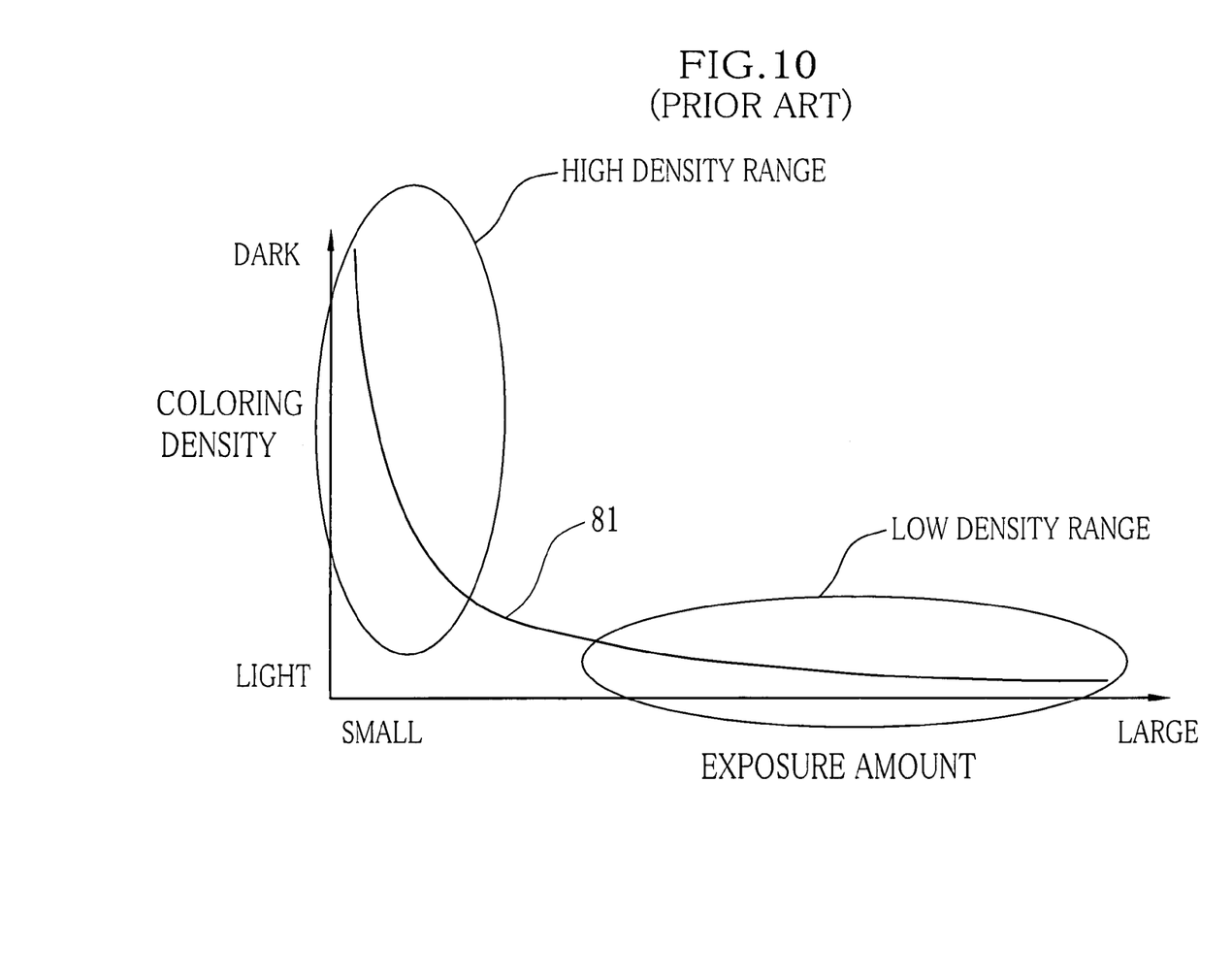
FIG. 10 shows a graph illustrating a coloring characteristic curve of an instant film unit.

FIG. 10 shows a characteristic curve 81 showing relationships between exposure amount of the instant film unit and coloring density of a positive image formed on an image receptive sheet of the instant film unit. As well-known in the art, a photosensitive sheet of the instant film unit is exposed to an optical image to form a latent image. Thereafter, a processing fluid is spread between the photosensitive sheet and the image receptive sheet, so the latent image is transferred to the image receptive sheet and developed as a positive image. Accordingly, the positive image gets the higher coloring density, the smaller the exposure amount of the photosensitive sheet. In other words, the larger the exposure amount of the photosensitive sheet, the positive image gets the lighter tones.

Figure 11:
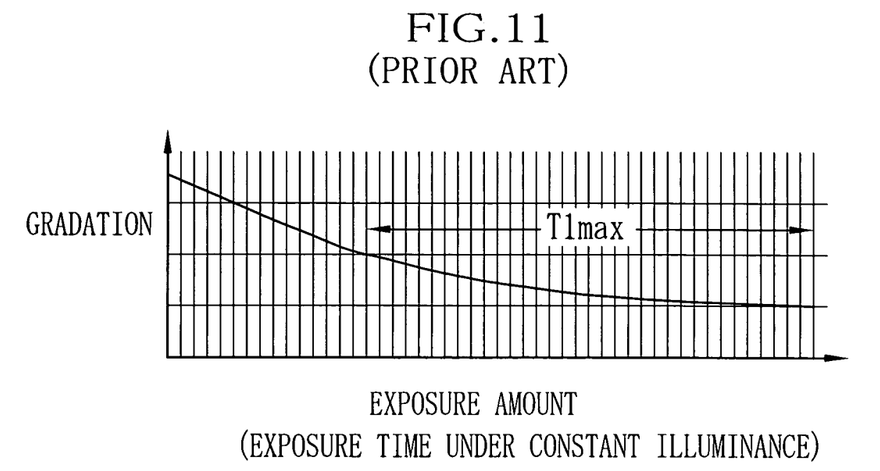
FIG. 11 shows a graph for explaining a relationship between tonal levels and exposure amount in a low density range of the coloring characteristic curve of FIG. 10.
Figure 12:
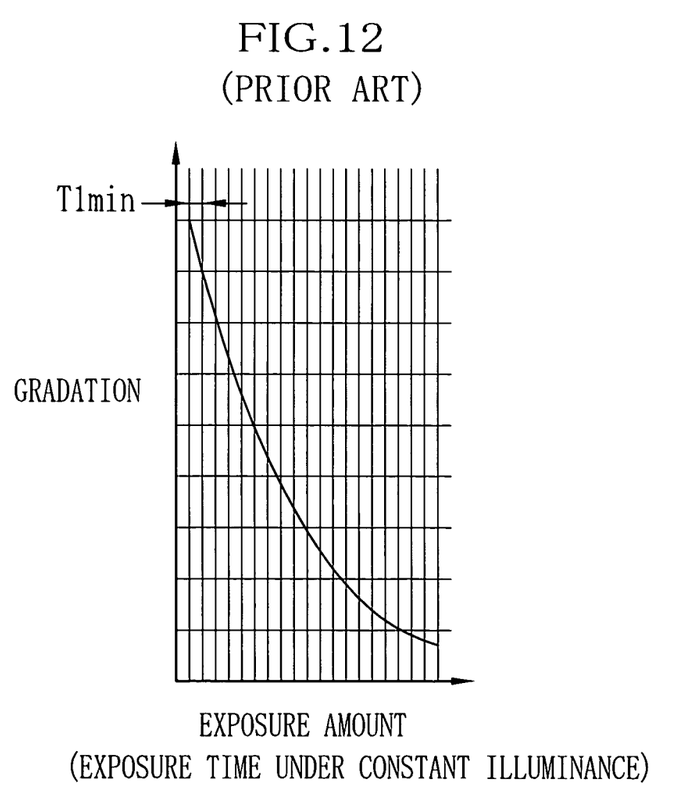
FIG. 12 shows a graph for explaining a relationship between tonal levels and exposure amount in a high density range of the coloring characteristic curve of FIG. 10.

FIG. 11 shows a relationship between gradations of the positive image and exposure amount of the instant film unit in a low density range, whereas FIG. 12 shows a relationship between gradations of the positive image and exposure amount of the instant film unit in a high density range. As seen from these graphs, it takes a large increment or decrement in the exposure amount to change the coloring density by one tonal step in the low density range. On the contrary, in the high density range, the density changes by one tonal step with a very small difference in the exposure amount, so a fine control of the exposure amount is necessary for reproducing gradations.

Since the lighting time of each light emitting element is controlled by the unit exposure time in the conventional optical printer while maintaining the luminance constant, it is necessary to define the unit exposure time to be short enough for permitting a fine control of the exposure time, in order to reproduce gradations even in the high density range. On the contrary, the exposure time must be changed by a remarkably larger amount to change the coloring density by one tonal step in the low density range than in the high density range. This is apparent from FIGS. 11 and 12, wherein $T1_{max}$ is an increment or difference in the exposure time necessary for changing the density from the second lowest tonal level to the lowest tonal level, whereas $T1_{min}$ is an increment in the exposure time necessary for changing the density from the highest tonal level to the second highest tonal level, assuming that the density of the highest tonal level, i.e. black, is obtained by not exposing the instant film unit to the light.

For these reasons, in a conventional optical printer, to reproduce the image in 256 gradations, i.e. in tonal levels of "0" to "255", the unit exposure time is defined to be T/1023, provided that T represents a longest exposure time necessary for coloring the image receptive sheet at a lowest density, i.e. the tonal level "0" that is approximately equal to white. In other words, the exposure time is controlled with a precision of T/1023.

Although the conventional method achieves the fine control of the exposure time, a remarkably larger number of drive pulses must be applied for recording one pixel in the low density range, so that a very high driving frequency is needed in order to cut the longest necessary exposure time T per one pixel and thus speed up the printing. Furthermore, because 10-bit control data is needed for controlling the exposure time with the precision of T/1023, it takes a certain time to process and transfer 10-bit control data, so that a very high processing speed is required for cutting down the longest exposure time T. Indeed the exposure time can be shortened by raising luminance from the printing head, because the data processing speed is limited, if the longest exposure time T does not have a certain length, the unit exposure time T/1023 would become too short to drive the light emitting elements. For these reasons, it has been hard to speed up the printing time in the conventional optical printer.

SUMMARY OF THE INVENTION

In view of the foregoing, an object of the present invention is to provide an optical printer and a driving method for the optical printer that drives a plurality of light emitting elements to emit light in accordance with image data for recording pixels of different densities on a photosensitive recording medium to form a grayscale image, whereby gradations may be reproduced with a sufficient fidelity even in the high density range of printed positive images, and a shorter printing time is achieved without the need for a very high driving frequency.

According to a method of the present invention, time lengths of lighting the individual light emitting elements are controlled in accordance with tonal levels of pixels to print that are represented by the image data, and simultaneously luminance of the respective light emitting elements is varied according a predetermined characteristic curve as the lighting time for each pixel elapses.

Since the longer exposure time is necessary for recording a pixel at the lower density on the instant photo film unit, it is preferable to raise the luminance as the lighting time for each pixel elapses, where the instant photo film unit is used as the photosensitive recording medium.

An optical printer of the present invention comprises:

a printing head having an array of light emitting elements arranged in a main scan direction; a driving device for driving the light emitting elements to emit light toward a photosensitive recording medium, while controlling time lengths of driving the individual light emitting elements per each pixel in accordance with tonal levels of pixels to print that are represented by image data; a control device for controlling luminance of the light emitting elements according a predetermined characteristic curve as the driving time for each pixel elapses; and a scanning device for shifting the printing head relative to the photosensitive recording medium in a sub scan direction perpendicular to the main scan direction after each line of the image is recorded on the photosensitive recording medium.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
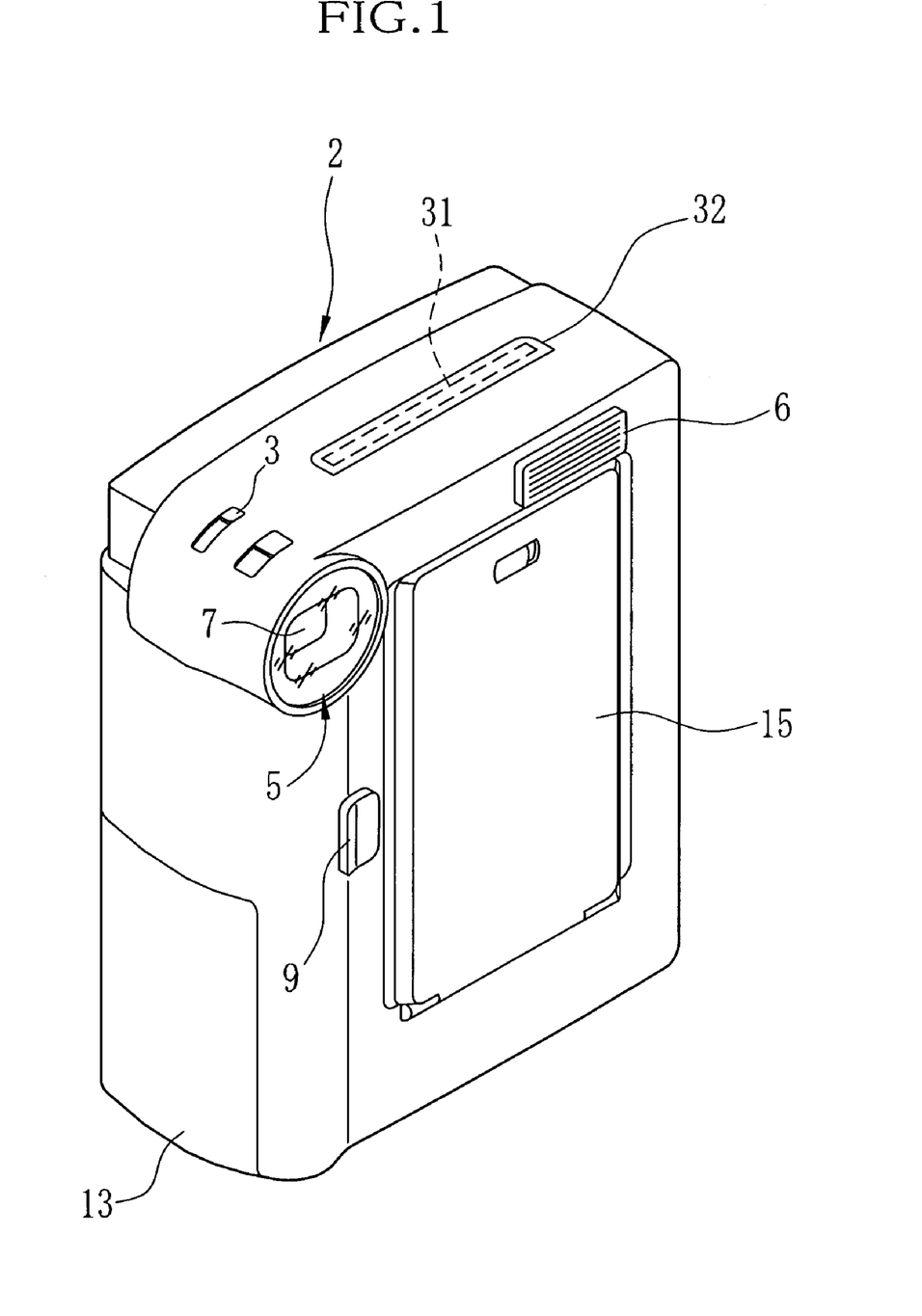
FIG. 1 shows a front perspective view of an electronic still camera incorporated with an optical printer according to an embodiment of the present invention.
Figure 2:
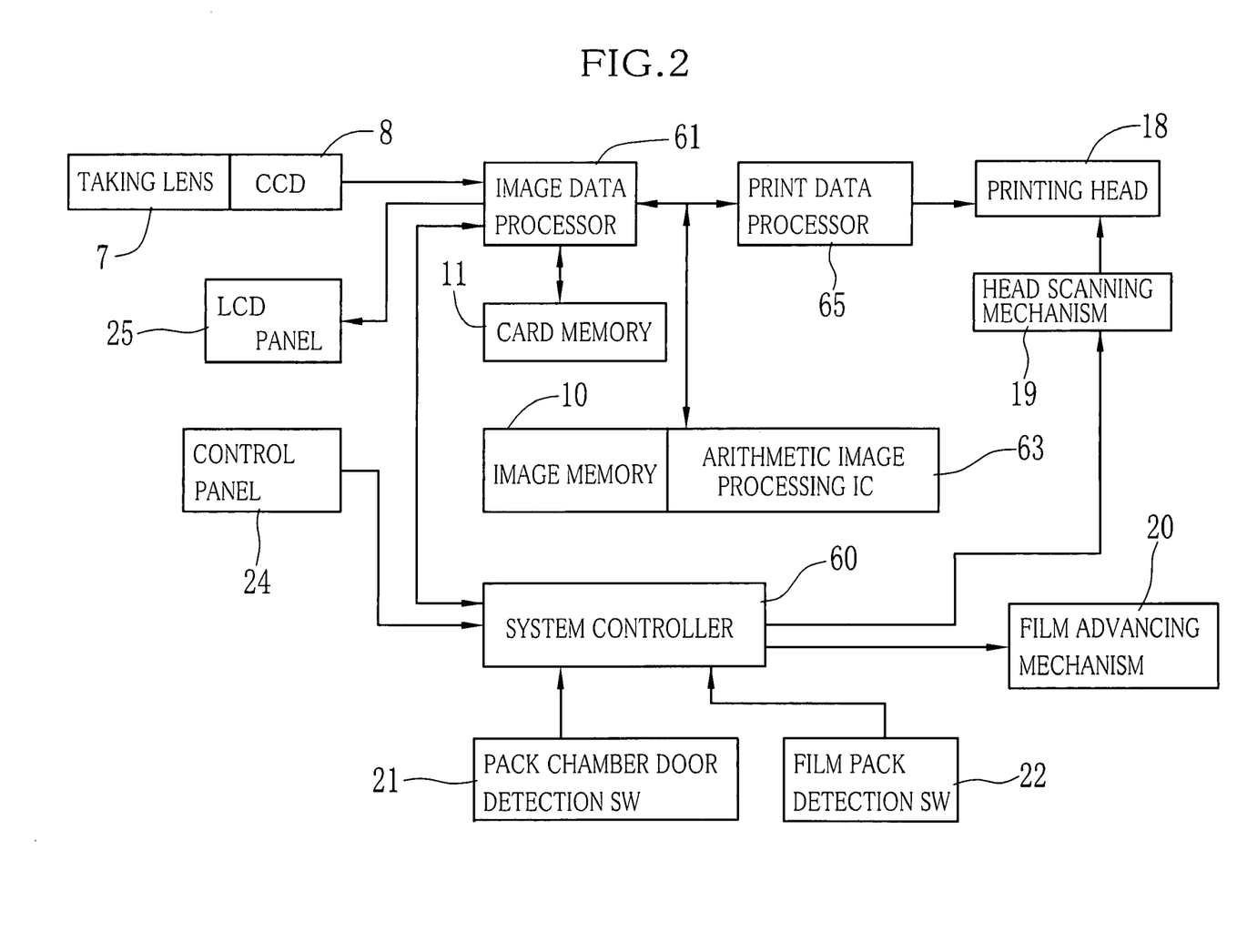
FIG. 2 shows a block diagram illustrating the circuitry of the electronic still camera of FIG. 1.

A printer-incorporated electronic still camera 2 shown in FIG. 1 is automatically set to a photography mode when a power switch 3 is turned on. An imaging section 5 and a flash projector 6 are located on an upper front portion of the still camera 2. A taking lens 7 is placed inside the imaging section 5. As shown in FIG. 2, a not-shown shutter mechanism, a stop mechanism and a CCD image sensor 8 are placed behind the taking lens 7, such that an optical image is formed through the taking lens 7 on the CCD image sensor 8 to pick up electronic image signals. A release button 9 is located below the imaging section 5. Upon the release button 9 being operated, electronic image signals of an image formed on the CCD image sensor 8 at that moment are recorded as digital image data on an image memory 10 or a card memory 11.

The image memory 10 is built in the camera 2, and stores the image data in a format specific to internal processing. The card memory 11 is an external memory that is attachable to the camera 2 through a not-shown card slot, and stores the image data in a compatible format so that the image data is available to personal computers and printers.

Figure 3:
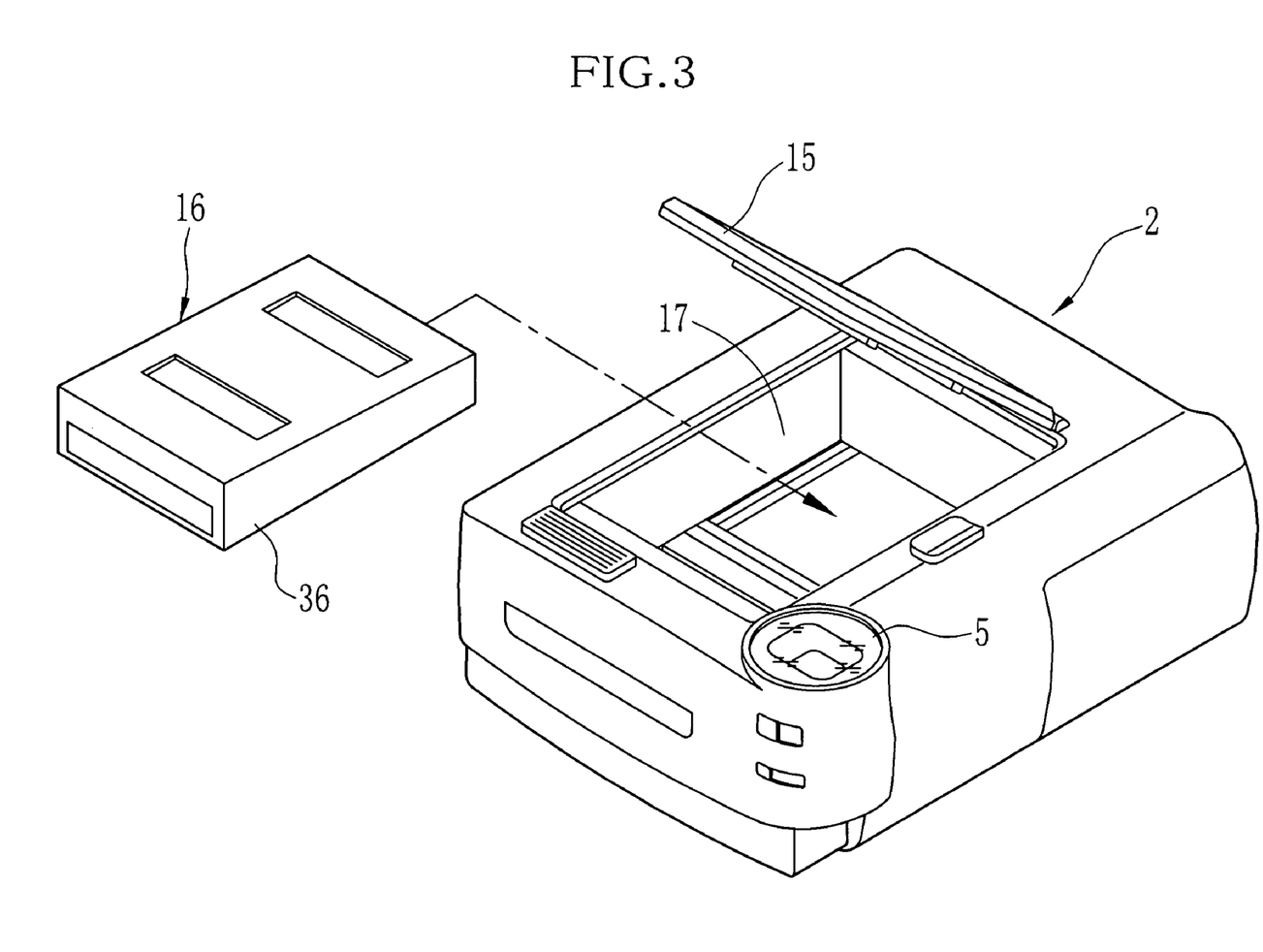
FIG. 3 shows a perspective view of the electronic still camera of FIG. 1 laid with its front side up and its pack chamber door open.

The flash projector 6 projects a flash light toward a subject whose brightness is below a predetermined level. A battery chamber lid 13 is provided on one side of the camera 2, through which power source batteries are loaded in the camera 2. A pack chamber door 15 is provided in a front middle portion of the camera 2, with its one side hinged. By opening the pack chamber door 15, as shown in FIG. 3, a film pack 16 containing a stack of instant film units 30 (see FIG. 4) may be loaded in a pack chamber 17. A pack chamber door detection switch 21 and a film pack detection switch 22 are provided in the pack chamber 17 for detecting whether the pack chamber door 15 is open or closed, and whether the film pack 16 is loaded or not, respectively.

Figure 4:
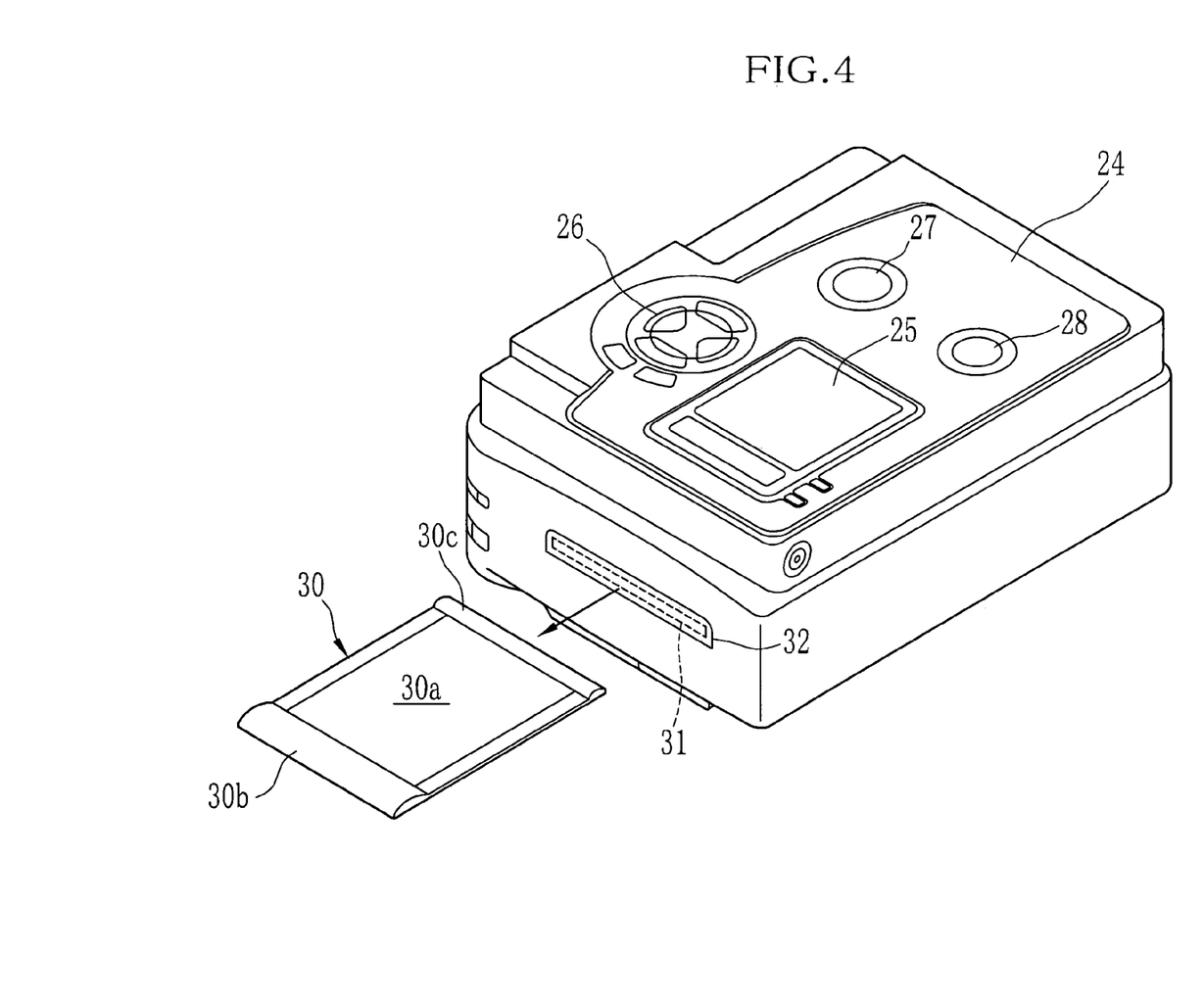
FIG. 4 shows a perspective view of the electronic still camera of FIG. 1 laid with its rear side up.

In the photography mode, the camera 2 is used in an upright posture as shown in FIG. 1. To observe the photographed images and select an image to print, the camera 2 is positioned with its rear side up, as shown in FIG. 4, so a control panel 24 provided on the rear side of the camera 2 may be operated while keeping the camera 2 in a stable condition.

The control panel 24 has an LCD panel 25, a cursor button 26, a mode selection button 27, a print start button 28 and other operation buttons incorporated therein. The LCD panel 25 functions as an electronic viewfinder in the photography mode. When the camera 2 is switched to a reproduction mode by operating the mode selection button 27, the LCD panel 25 functions as a display device for displaying a still image that is reproduced from the image data read out from the image memory 10 or the card memory 11. The cursor button 26 is used for digital zooming, and also for many other operations in the respective modes in combination with the mode selection button 27. When the print start button 28 is pressed, the camera 2 is switched to the print mode, and begins to print the still image as displayed on the LCD panel 25 at that moment.

Figure 5:
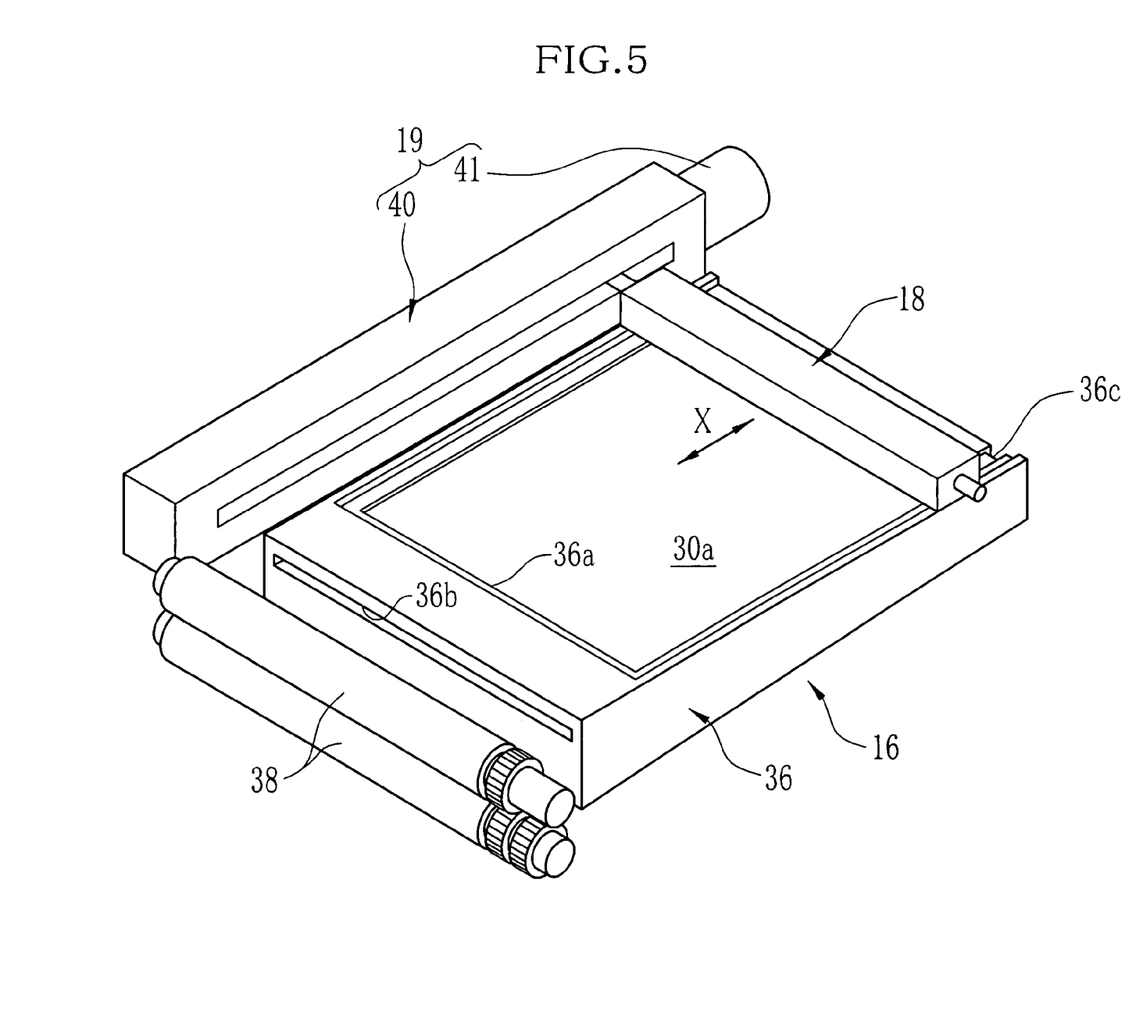
FIG. 5 shows a schematic perspective view of the optical printer incorporated into the electronic still camera of FIG. 1.

Behind the pack chamber 17, a printer section is mounted for printing an image on the instant film unit 30 of the film pack 16. As shown in FIG. 5, the printer section is constituted of a printing head 18 for projecting printing light beams toward the instant film unit of the film pack 16, a head scanning mechanism 19 for making the printing head 18 scan the instant film unit 30, and a film advancing mechanism 20 (see FIG. 2) for advancing the exposed instant film unit 30 out of the camera 2. The film advancing mechanism includes a pair of spread rollers 38 and a not-shown pushing claw device. The spread rollers 38 are placed behind a film ejection slot 31 is formed through a top wall of the camera 2, as shown in FIG. 4, for ejecting the exposed instant film unit 30 out of the camera 2. The film ejection slot 31 is usually covered with a door 32 in a light-tight fashion, and the door 32 is pushed open by the advancing instant film unit 30.

As conventional, the instant film unit 30 consists of a photosensitive sheet 30a, a not-shown image receptive sheet on the back of the photosensitive sheet 30a, a processing fluid pod 30b provided along a leading margin of the photosensitive sheet 30a in the advancing direction, and a trap 30c provided along an opposite margin to the processing fluid pod 30b.

A container 36 of the film pack 16 is formed with an exposure opening 36a, an ejection slot 36b and a cutout 36c. The exposure opening 36a is for exposing the photosensitive sheet 30a of a topmost one of the stacked instant film units 30 to the printing light from the printing head 18. Through the cutout 36c, a claw member of the pushing claw device of the film advancing mechanism pushes the exposed instant film unit 30 at the trailing end. Thus, the leading end of the exposure instant film unit 30 is advanced out of the container 36 through the ejection slot 36b, and is nipped between the spread rollers 38. The spread rollers 38 are rotated by a not-shown motor to advance the exposed instant film unit 30 out of the camera 2 through the film ejection slot 31.

While squeezing through between the spread rollers 38, the pod 30b is ruptured and the processing fluid is spread between the photosensitive sheet and the image receptive sheet. Thus a negative latent image printed on the photosensitive sheet is developed and transferred as a positive image onto the image receptive sheet. Redundant processing fluid is absorbed in the trap 30c. Although it is not shown in the drawing, the exposure opening 36a, the ejection slot 36b and the cutout 36c are closed by a light-shielding sheet before the film pack 16 is used. Immediately after the film pack 36 is newly loaded and the pack chamber door 15 is closed, the light-shielding sheet is automatically ejected out of the camera 2 by the film advancing mechanism 20 in the same way as the exposed instant film sheet 30.

The head scanning mechanism 19 consists of a scanning unit 40 and a drive motor 41 for driving the scanning unit 40. The scanning unit 40 extends a sub scan direction X that is parallel to the film advancing direction, and carries the printing head 18 back and forth in the sub scan direction X, whereas the printing head 18 extends in a main scan direction perpendicular to the sub scan direction X.

Figure 6:
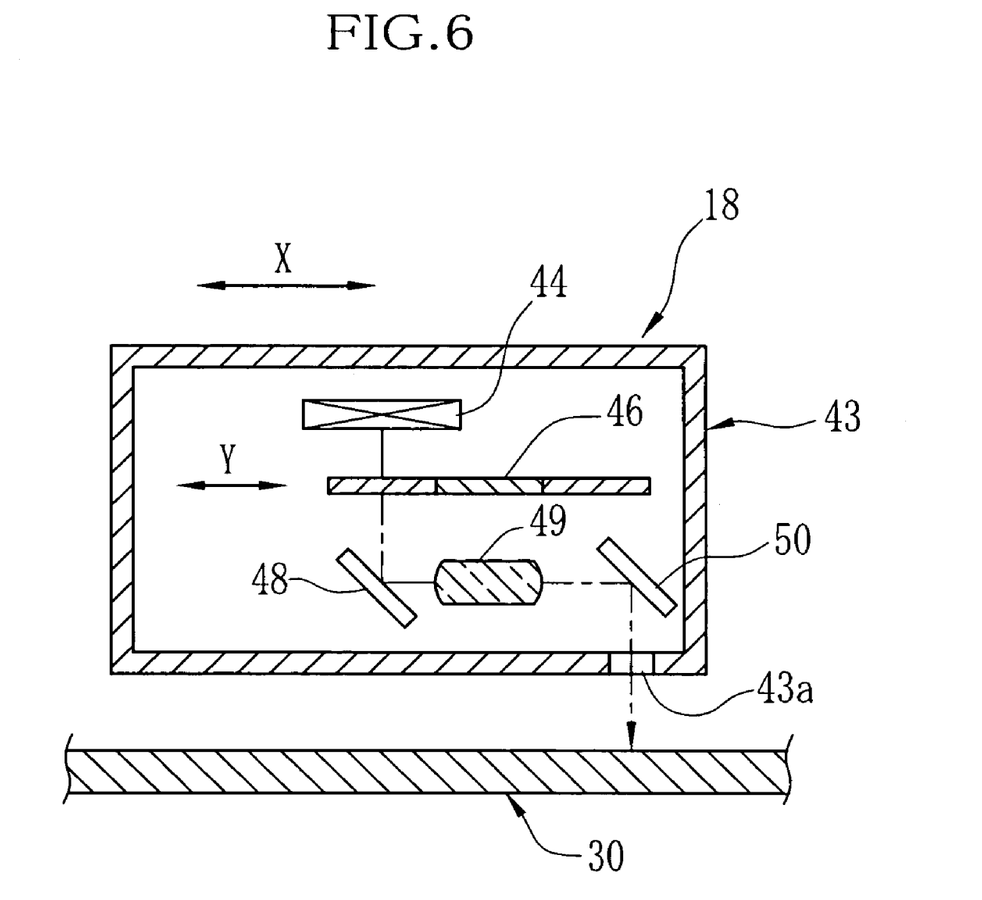
FIG. 6 shows an explanatory sectional view of a printing head of the optical printer of FIG. 5.

FIG. 6 shows an example of the printing head 18, wherein a flat light source 44 is mounted in a light-tight casing 43. The light source 4 is provided with an array of light emitting elements arranged along the main scan direction, each of which emits a light beam consisting of red, green and blue light components. The intensity of light beam may be varied with drive voltage applied to the light emitting element.

In this example, the light source 44 is a fluorescent display panel that contains a filament as a cathode and an array of anodes in a vacuum container such that the filament radiates thermions when heated up to about 600° C. by being applied a predetermined voltage. When the drive voltage is applied to the anode, the radiated thermions crash on a fluorescent object that is printed on the anode, exciting the fluorescent object to emit a light beam. Each light emitting element is constituted of the anode and the fluorescent object, and corresponds to one pixel.

A color filter 46 is placed in a light path from the light source 44. The color filer 46 is constituted of a red pass filter portion, a green pass filter portion and a blue pass filter portion arranged in three rows in parallel to the light emitting element array. The color filter 46 may be shifted in a perpendicular direction Y to the light emitting element array, i.e. to the main scan direction, so one of the three color filter portions is placed in the light path from the light source 44. Thus, red, green or blue color printing light beams are selectively produced from the light beams of the light source 44. The printing light beams are directed an exit 43a of the printing head 43 through a mirror 48, a SELFOC lens array 49 and a mirror 50, and is projected from the exit 43a toward the instant film unit 30 of the film pack 16. The SELFOC lens array 49 prevents each light beam from diverging to adjacent pixel areas. It is to be noted that the casing 43 is provided with appropriate light-shielding members so that only the printing light beams are projected from the exit 43a.

Referring back to FIG. 2, the operation of the camera 2 is totally controlled by a system controller 60 that consists of a CPU, a program ROM, a data RAM and other elements. The optical images formed on the CCD image sensor 8 are converted into electronic image signals, and fed to an image data processor 61. In the photography mode, the image data processor 61 controls the CCD image sensor 8, and converts the electronic image signals into NTSC picture signals. The NTSC picture signals are fed to the LCD panel 25, so the LCD panel 25 displays moving images corresponding to the optical images formed on the CCD image sensor 8 in a real time fashion. Thus, LCD panel 25 functions as an electronic viewfinder.

When the release button 9 is pressed in the photography mode, the image data processor 61 converts the image signal of an optical image that is obtained through the CCD image sensor 8 at that moment, into image data of a specific digital format, and feeds the image data to an arithmetic image processing IC 63. The arithmetic image processing IC 63 writes the image data on the image memory 10. If the image data is to be written on the card memory 11, the arithmetic image processing IC 63 converts the image data from the specific format into a compatible format available for external apparatuses and, thereafter, writes the image data on the card memory 11 through the image data processor 61 serving as an interface at that time.

The arithmetic image processing IC 63 also converts the specific image data into print data when the print start button 28 is pressed in the reproduction mode, and feeds the print data to a print data processor 65. The print data processor 65 separates the print data into three color frame data, and separates each color frame data into line data. Based on the line data of one color frame, the print data processor 65 outputs drive data for each light emitting element whose value varies with the tonal level of the corresponding pixel to print.

Figure 7:
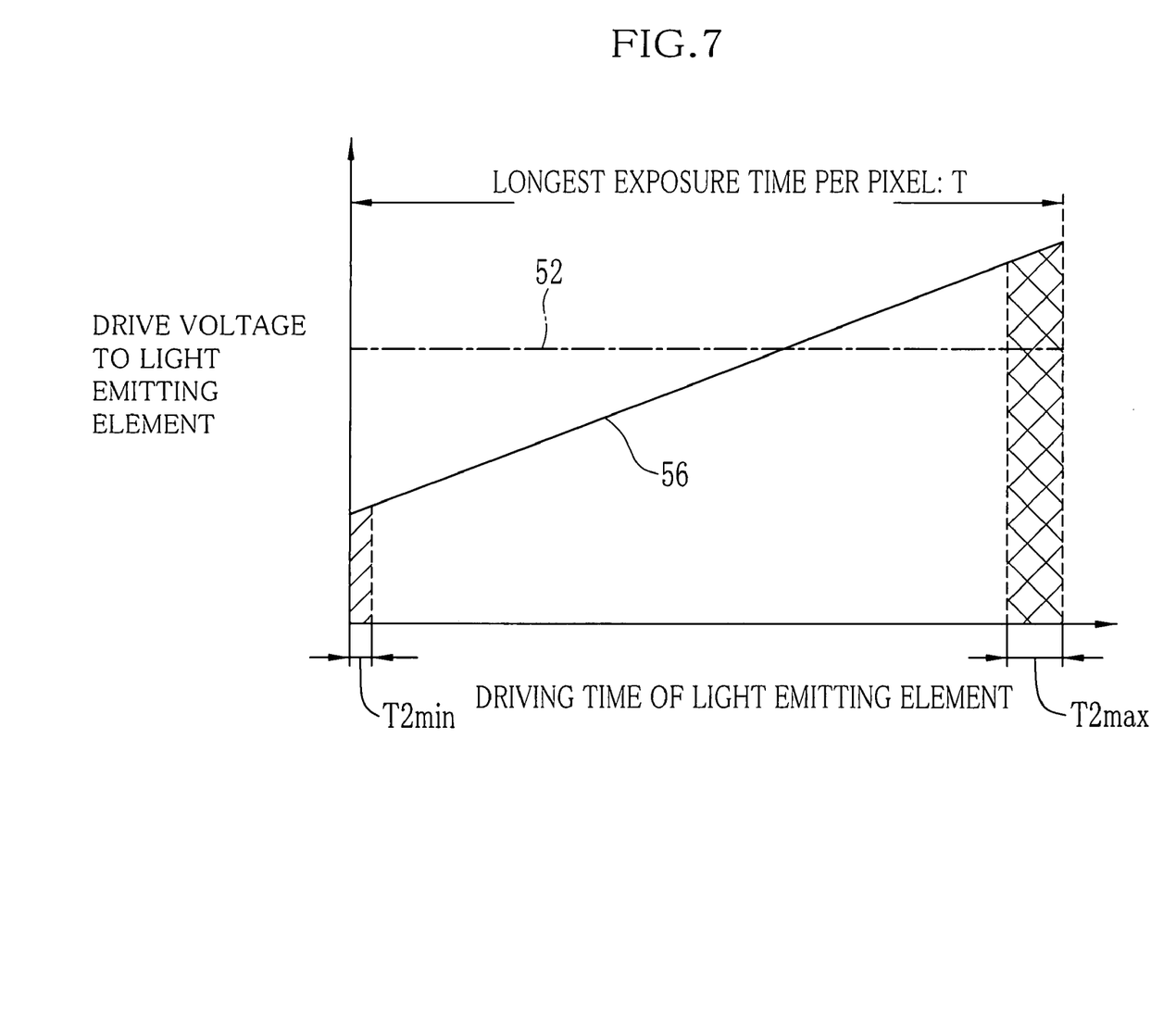
FIG. 7 shows a graph illustrating a characteristic curve for changing drive voltage applied to light emitting elements of the printing head with their driving time, according to a first driving method of the present invention.

As set forth above, in the conventional optical printer, the gradations are reproduced by changing merely the lighting time of each light emitting element, while the drive voltage is maintained constant, as is shown by chain-dotted lines 52 in FIG. 7. As a result, the gradient of the coloring density curve with respect to the exposure time in the high density range is remarkably different from that in the low density range, as shown in FIGS. 10 to 12. To make it possible to reproduce the gradation in the high density range, the unit exposure time is determined to be T/1023 for 256 gradations, wherein T represents the longest exposure time necessary for coloring the instant film unit 30 at the lowest density, i.e. the tonal level "0". Therefore, 10-bit print data is produced from the 8-bit image data, so a very high data transfer speed is needed for transferring the print data to the printing head.

On the contrary, according to the driving method of the present invention, the exposure amount per one pixel is controlled by changing the drive voltage as well as the exposure time. In a first embodiment of the driving method, the luminance of the light emitting elements are raised with time at a constant rate from a constant initial value for recording each pixel, whereas a lighting time length is determined for each tonal level based on the initial value and rising rate of the luminance of the light emitting elements and the coloring characteristics of the photosensitive recording medium that is shown in FIG. 10.

Figure 8:
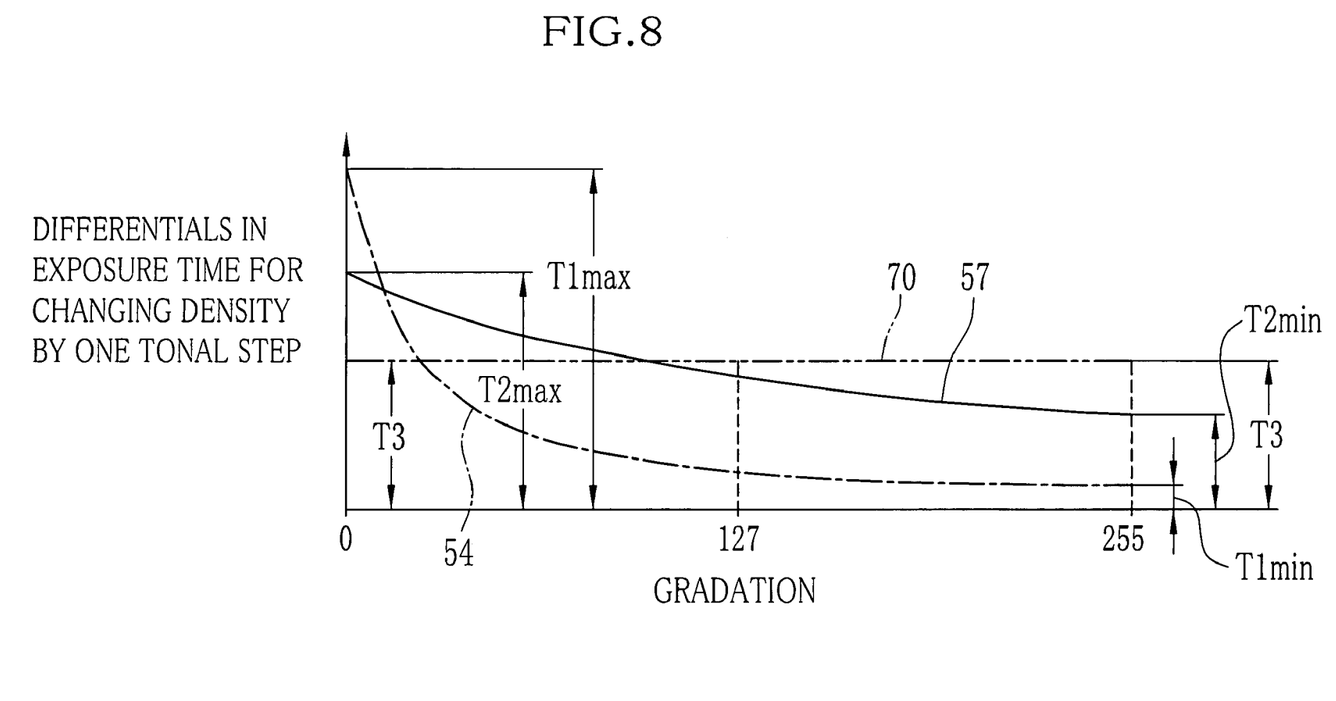
FIG. 8 shows a graph illustrating differentials in exposure time necessary for changing coloring density by one tonal step on an instant film unit, wherein a curve 54 shows the differentials of a conventional driving method, a curve 57 shows those of the first driving method of the present invention, and a curve 70 shows those of a second driving method of the present invention.

Concretely, the drive voltage applied to the light emitting elements of the light source 44 is raised in proportion to the exposure time, from a predetermined lower level to a predetermined higher level within a printing cycling of one line, as shown by a slid line 56 in FIG. 7. Consequently, the luminance of the light emitting elements increases proportionally with time during the recording of one pixel, assuming that the luminance of the light emitting element is proportional to the drive voltage. Because the exposure amount may be defined as a product of the exposure time and the luminance, exposure times for the respective tonal levels may be defined based on the increasing drive voltage and the exposure amounts necessary for coloring the instant film unit 30 at the respective tonal levels. Consequently, in the first embodiment, the exposure times for the respective tonal levels are changed from one another by different amounts in a manner as shown by a curve 57 in FIG. 8. FIG. 8 shows differentials in the exposure time per one tonal step, i.e. increments/decrements in the exposure time necessary for changing the density by one tonal step. On the other hand, a curve 54 shows the differentials in the exposure time per one tonal step according to the conventional method.

Since the drive voltage is set lower than conventional in the first stage of the printing cycle for one line, a shortest exposure time $T2_{min}$ that is determined for recording a pixel at the second highest density may be longer than the conventional one $T1_{min}$, as shown in FIG. 8, assuming that the density of the highest tonal level is obtained by not exposing the instant film unit 30 to the light. On the other hand, by raising the drive voltage proportionally with the exposure time per one pixel, it becomes possible to change the exposure time by a smaller amount for changing the density by one tonal step in the low density range, as compared with the conventional case where the drive voltage is unchanged. By raising the drive voltage up to a higher level in the last stage of the printing cycle for one line, the maximum difference in the exposure time that is necessary for changing the density between the lowest density to the second lowest density may be a smaller value $T2_{max}$ than the conventional one $T1_{max}$.

It is to be noted that a hatched area in the graph of FIG. 7 corresponds to an exposure amount for recording a pixel at the second highest tonal level, whereas a cross-hatched area in FIG. 7 corresponds to an exposure amount for decreasing the density from the second lowest tonal level to the lowest tonal level. An area defined as a product of the longest exposure time T and the increasing drive voltage 56 corresponds to the exposure amount for coloring the instant film unit 30 at the lowest density.

Accordingly, it comes to be possible to control the exposure time with lower accuracy, so the unit exposure time is defined to be T/511 in the present embodiment for reproducing 256 gradations, wherein T represents the longest necessary exposure time for recording a pixel at the lowest density. Thereby, 9-bit print data may be used for controlling the printing head 18. Thus, the print data may be processed and transferred at a lower speed than conventional. Since the unit exposure time is elongated relative to the longest exposure time T, it is possible to make the longest exposure time T short by increasing the luminance, without the need for a very high driving frequency.

Now the operation of the present embodiment will be described.

When the power switch 3 is turned on, the still camera 2 is initially set at the photography mode, so images formed through the taking lens 7 on the CCD image sensor 8 are converted into the NTSC signal through the image data processor 74. Based on the NTSC signal, the LCD panel 25 displays the images as being picked up through the CCD image sensor 8.

When the photographer presses the release button 9 while framing through the LCD panel 25, the image photographed through the CCD image sensor 8 at that moment is converted into image data of the specific format through the image data processor 74. If the photographer previously designates the image data to be written on the image memory 10 by operating the control panel 24, the image data is written in the specific format on the card memory 11 through the arithmetic image processing IC 63. If the photographer designates the image data to be written on the card memory 11, the image data is converted from the specific format into the compatible format through the arithmetic image processing IC 63 and thereafter written on the card memory 11 through the image data processor 61.

To make a hard copy of the photographed image, the mode selection button 27 is operated to switch the still camera 2 to the reproduction mode. Thereafter, the still camera 2 is laid with its front side down, as shown in FIG. 4. By operating the cursor button 26 and other buttons, an appropriate one of the photographed images is selectively displayed on the LCD panel 25 while the image data processor 61 is reading out the image data from the image memory 10 or the card memory 11, converting it into the NTSC signal, and sending the NTSC signal to the LCD panel 25.

Upon the print start button 28 is pressed in the reproduction mode, the arithmetic image processing IC 63 converts the image data of the presently displayed image into print data, and feeds the print data to the print data processor 65. The print data processor 65 separates the print data into three color frame data, and separates each color frame data into line data. In this embodiment, each image is printed in a three color frame sequential fashion in the order of red, green and blue. So the print data processor 65 first outputs drive data based on the line data of a first line of the red frame. Also, the red pass filter portion of the color filter 46 is initially placed in the light path of the light source 44.

After it is confirmed by a not-shown sensor that the printing head 18 is in an initial position shown in FIG. 5, where the printing head 18 faces a bottom end of the exposure opening 36a of the film pack 16, the drive data is fed to the printing head 18. Then, the lighting times of the respective light emitting elements of the light source 44 are changed by applying a different number of drive pulses per one pixel in accordance with the tonal levels of the corresponding pixels to print. At the same time, the luminance of the individual light emitting elements is also raised by increasing the drive voltage applied to the light emitting elements in proportion to the exposure time within the printing cycle of the first line, in the way as shown in FIG. 7.

Since the unit exposure time is defined to be T/511 in the present embodiment, at most 511 drive pulses per one pixel are transferred to the light emitting elements in each printing cycle of one line, synchronously with a common clock signal. The larger number of drive pulses produce the lower pixel density. However, because of the increasing luminance, the number of drive pulses per one pixel does not correspond to the tonal level, but is varied in accordance with the differentials in the exposure time shown by the curve 57 in FIG. 8.

After the printing head 18 records the first line of the red image in this way, the motor 41 of the head scanning mechanism 19 is driven by a predetermined rotational amount to move the printing head 18 in the sub scan direction X toward the spread rollers 38, to place it at the next line recording position. Also, the printer data processor 65 outputs drive data for a second line of the red image to the printing head 18. Thus, the second line of the red line is recorded in the same way as for the first line, while increasing the drive voltage and thus the luminance of the light emitting elements in the way as shown in FIG. 7, from the start to the end of exposure for the second line.

In this way, the red image is recorded line after line as the printing head 18 moves toward the spread rollers 38. When the red image is completely recorded on the instant film unit 30, the system controller 60 sends a filter switching signal to the printing head 18, so the color filer 46 is shifted in the direction Y by a amount to place the green pass filter portion in the light path of the light source 44. Simultaneously, the print data processor 65 produces drive data from the printer data of the last line of the green image, and outputs the drive data to the printing head 18. Thereafter, the green image is recorded in a similar way to the red image, but from the last line to the first line, as the printing head 18 is moved toward the initial position.

After the green image is completely recorded, the blue pass filter portion of the color filter 46 is inserted into the light path of the light source 44, and then the blue image is recorded in the order from the first line to the last line as the printing head 18 moves toward the spread rollers 38 again. Also for the green and blue image recording, the exposure amount for each pixel is individually controlled by changing the exposure time while raising the luminance with time within each printing cycle of one line, so the gradations are adequately reproduced in a shorter printing time than conventional.

When the three color frames have been recorded, the system controller 60 starts driving the film advancing mechanism 20, so the pushing claw pushes the trailing end of the exposed instant film unit 30 through the cutout 16c. Then, the leading end of the exposure instant film unit 30 is protruded through the ejection slot 36b and is nipped between the spread rollers 38. On the other hand, the printing head 18 is moved back to the initial position after the pushing claw moves out of the film pack casing 36. While the exposed instant film unit 30 is ejected out of the camera 2 through the spread rollers 38, the pod 30b is ruptured to spread the processing fluid. In a few minutes after the instant film unit 30 is ejected out of the film ejection slot 31, the recorded image appears as a positive image.

As described so far, according to the first embodiment, the exposure time is changed by a larger amount to change the density by one tonal step in the lower density range, as shown by the curve 57 in FIG. 8, while the drive voltage and thus the luminance is raised proportionally to the exposure time within the printing cycle of one line.

According to a second embodiment of the driving method of the present invention, the lighting time lengths of the individual light emitting elements are varied proportionally to the tonal levels of the pixels to print, whereas the luminance of the light emitting elements are raised with time for recording each pixel according to a non-linear curve that is determined by the lighting time lengths for the individual tonal levels and coloring characteristics of the photosensitive recording medium.

Figure 9:
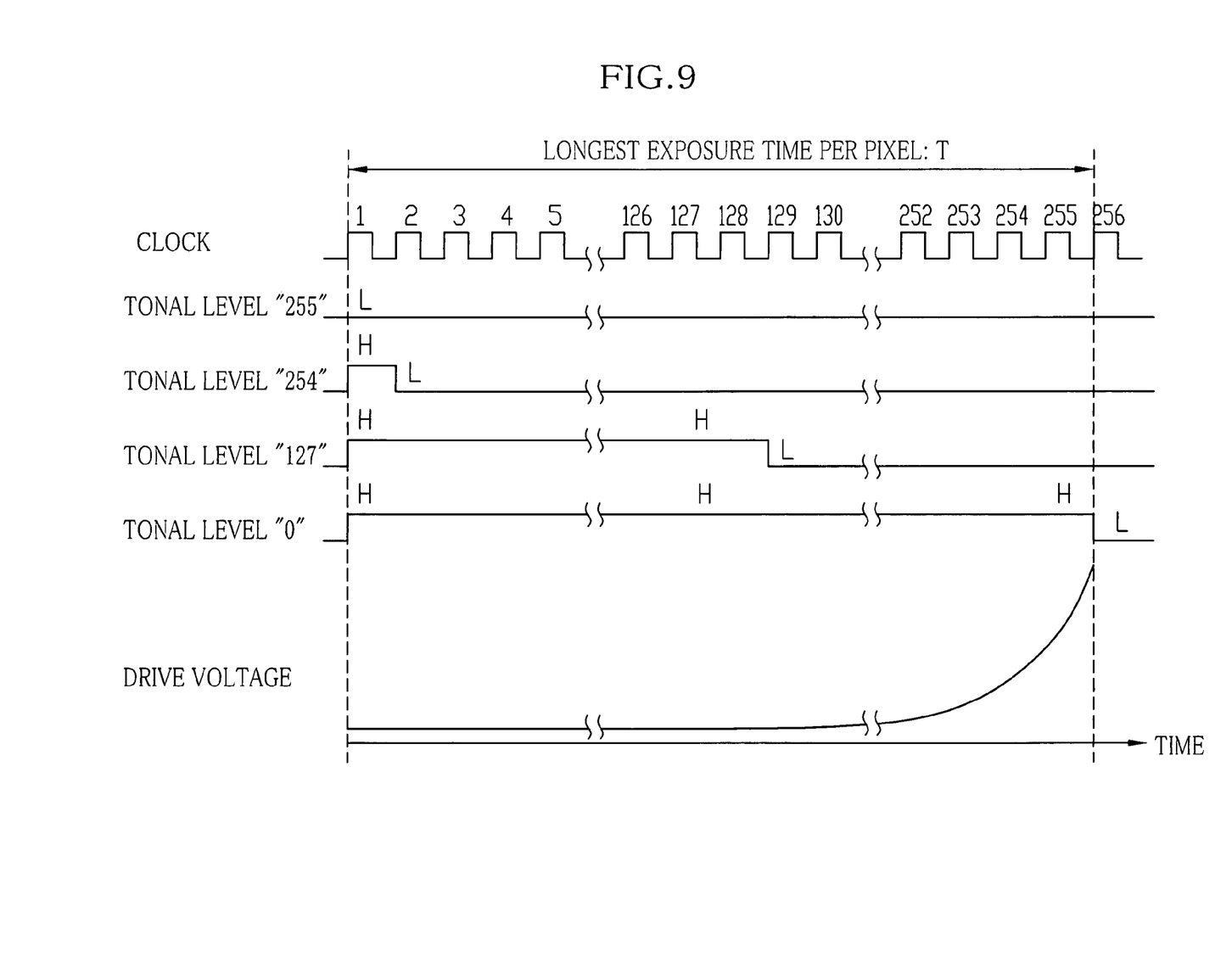
FIG. 9 shows timing charts illustrating a characteristic curve of the drive voltage according to the second driving method, with reference to drive data for controlling exposure time in accordance with the tonal levels.

In the second embodiment, the exposure time is changed by a constant amount T3 for one tonal step in the whole density range, as shown by phantom lines 70 in FIG. 8, while the drive voltage for the light emitting elements is raised non-linearly with the exposure time, as shown in FIG. 9.

Because the exposure amount may be defined as a product of the exposure time and the luminance, the drive voltage may be defined based on the exposure times for the respective tonal levels and the exposure amounts necessary for the respective tonal levels. Since a remarkably larger increment in the exposure amount is necessary for decreasing the density by one tonal step in the low density range than in the high density range, the drive voltage is increased more steeply in the last stage of exposure in the second embodiment where the increment in the exposure time per one tonal step is constant.

According to the second embodiment, the coloring density comes to decrease proportionally with the exposure time, so that it comes to be possible to control the exposure time in 256 steps for obtaining 256 gradations. Therefore, the unit exposure time may be defined to be T/255, so it is possible to use 8-bit print data for controlling the exposure amount. By setting the pulse width of each drive pulse to be equal to T/255, 255 drive pulses are applied to the light emitting element for recording a pixel at the lowest density, i.e. the tonal level "0". Therefore, the printing head 18 may be controlled at a low driving frequency. Since the unit exposure time is still more elongated relative to the longest exposure time T per one pixel, it is possible to reduce the longest exposure time T without the need for a very high data transfer speed.

Although the tonal level "0" represents white and "255" represents black in the above embodiment, it is possible to allocate the tonal levels in the opposite way, i.e. "0" for black and "255" for white. In that case, the curves shown in the graph of FIG. 8 should be modified correspondingly with respect to the horizontal axis that represents the gradation.

Although the present invention has been described so far with respect to the optical printer incorporated into the electronic still camera, the present invention is of course applicable to an independent optical printer. The present invention is not only applicable to the optical printer that uses the instant photo film unit, but also applicable to any types of optical printers that use other kinds of photosensitive recording medium, e.g. photographic paper. The present invention is also applicable to a case that uses a monochromatic photosensitive recording medium.

Also, the configuration of the printing head is not limited to the above embodiment. For example, the light source of the printing head is not to be limited to the fluorescent display panel, but may be constituted of other kind of light emitting elements, e.g. an array of LEDs or a fluorescent lamp combined with an array of liquid crystal segments. Instead of changing the drive voltage, it is also possible to control the luminance of the printing light by other method, e.g. by changing transparencies of liquid crystal segments.

Thus, the present invention is not to be limited to the above embodiment but, on the contrary, various modification will be possible to those skilled in the art without departing from the scope of claims appended hereto.

What is claimed is:

1. A driving method for an optical printer that drives a plurality of light emitting elements to emit light in accordance with image data, for recording pixels of different densities on a photosensitive recording medium to form a grayscale image, the method comprising the steps of:

determining time lengths of lighting the individual light emitting elements in accordance with tonal levels of pixels to print that are represented by the image data; and     changing luminance of the respective light emitting elements according a predetermined characteristic curve as the determined lighting time for each pixel elapses.

2. A driving method as claimed in claim 1, wherein the photosensitive recording medium is a self-developing type photo film unit, and the luminance of the respective light emitting elements is raised as the lighting time for each pixel elapses.

3. A driving method as claimed in claim 1 or 2, wherein the luminance of the light emitting elements is changed with time at a constant rate from a constant initial value for each pixel, whereas alighting time length for each tonal level is determined by the initial value and changing rate of the luminance of the light emitting elements and coloring characteristics of the photosensitive recording medium.

4. A driving method as claimed in claim 1 or 2, wherein the lighting time lengths of the individual light emitting elements are changed proportionally to the tonal levels of the pixels to print, whereas the luminance of the light emitting elements is changed with time for recording each pixel according to a non-linear curve that is determined by the lighting time lengths for the individual tonal levels and coloring characteristics of the photosensitive recording medium.

5. A driving method as claimed in claim 1, further comprising the steps of moving a printing head that has the plurality of light emitting elements aligned along a main scan direction, and the photosensitive recording material relative to each other in a sub scan direction perpendicular to the main scan direction, for recording the image line by line.

6. A driving method as claimed in claim 1, wherein the light emitting elements are driven a number N of times of a constant unit time for recording each pixel, the number N being 0 or an positive integer and varied depending upon the tonal level of the pixel to print, to control the lighting time lengths.

7. The method of claim 1, wherein the luminance of the light emitting elements is varied during an exposure time for recording the pixels.

8. The method of claim 7, wherein the luminance is controlled by varying a driving voltage at at least three different levels simultaneously with controlling time length of the individual light emitting elements.

9. The method of claim 8, wherein the driving voltage increases as the exposure time increases.

10. An optical printer for printing a grayscale image on a photosensitive recording medium based on image data, the optical printer comprising:

a printing head having a plurality of light emitting elements arranged in a main scan direction, for projecting light beams toward the photosensitive recording medium;

a driving device for driving the light emitting elements while determining time lengths of driving the individual light emitting elements per each pixel in accordance with tonal levels of pixels to print that are represented by the image data;

a control device for changing luminance of the light emitting elements according a predetermined characteristic curve as the determined driving time for each pixel elapses; and     a scanning device for shifting the printing head relative to the photosensitive recording medium in a sub scan direction perpendicular to the main scan direction after each line of the image is recorded on the photosensitive recording medium.

11. An optical printer as claimed in claim 10, wherein the printing head is a fluorescent display panel that contains an array of the light emitting elements in a vacuum container, wherein luminance of the light emitting element is variable depending upon drive voltage applied thereto, and the control device controls the drive voltage according the predetermined characteristic curve as the driving time for each pixel elapses.

12. An optical printer as claimed in claim 11, wherein the photosensitive recording medium is a self-developing type photo film unit, and the control device raises the drive voltage as the driving time for each pixel elapses.

13. The optical printer of claim 10, wherein the luminance of the light emitting elements is varied during an exposure time for printing the pixels.

14. The optical printer of claim 13, wherein the luminance is controlled by varying a driving voltage at at least three different levels simultaneously with controlling time length of the individual light emitting elements.

15. The optical printer of claim 14, wherein the driving voltage increases as the exposure time increases.

* * * * *